United States Patent
Nicholas et al.

(10) Patent No.: US 12,401,177 B2
(45) Date of Patent: Aug. 26, 2025

(54) AIRCRAFT CABLE RACEWAY AND ELECTRICAL BARRIER DEVICE

(71) Applicant: LATELEC, Toulouse (FR)

(72) Inventors: Jay Nicholas, Llantrissant (GB); Streeghosh Vinayan Sudha, Leipzig (DE)

(73) Assignee: LATELEC, Toulose (FR)

( * ) Notice: Subject to any disclaimer, the term of this patent is extended or adjusted under 35 U.S.C. 154(b) by 36 days.

(21) Appl. No.: 18/262,200

(22) PCT Filed: Jan. 13, 2022

(86) PCT No.: PCT/EP2022/050618
§ 371 (c)(1),
(2) Date: Jul. 20, 2023

(87) PCT Pub. No.: WO2022/157065
PCT Pub. Date: Jul. 28, 2022

(65) Prior Publication Data
US 2024/0313513 A1  Sep. 19, 2024

(30) Foreign Application Priority Data
Jan. 21, 2021  (FR) .................. FR2100565

(51) Int. Cl.
*H02G 3/04*  (2006.01)
*H02G 3/06*  (2006.01)

(52) U.S. Cl.
CPC ......... *H02G 3/0437* (2013.01); *H02G 3/0608* (2013.01)

(58) Field of Classification Search
None
See application file for complete search history.

(56) References Cited

U.S. PATENT DOCUMENTS

| | | | | |
|---|---|---|---|---|
| 3,351,699 | A | * 11/1967 | Merckle | H02G 3/0418 174/101 |
| 6,143,984 | A | * 11/2000 | Auteri | H02G 3/0608 174/101 |
| 10,400,918 | B2 | * 9/2019 | Webb | F16L 59/14 |
| 2001/0017214 | A1 | 8/2001 | Saeki | |
| 2010/0193238 | A1 | * 8/2010 | Duffy | H02G 3/0412 174/520 |
| 2012/0205134 | A1 | * 8/2012 | Brasier | H02G 3/0443 174/68.3 |
| 2015/0136478 | A1 | * 5/2015 | Biesse | B64C 1/406 174/72 A |
| 2018/0277965 | A1 | * 9/2018 | Dhanjal | H01R 4/4821 |

FOREIGN PATENT DOCUMENTS

| | | |
|---|---|---|
| EP | 2624388 | 8/2013 |
| GB | 2575107 | 1/2020 |

* cited by examiner

*Primary Examiner* — Krystal Robinson
(74) *Attorney, Agent, or Firm* — Defillo & Associates, Inc.; Evelyn A. Defillo

(57) ABSTRACT

An electrical barrier device (8) for an aircraft cable raceway, designed to be positioned where two profile sections (1, 2) meet, and including: at least one bottom-wall bridging base; at least one dielectric panel running transversely to the bottom-wall bridging base and with the bottom-wall bridging base delimiting a passage for cables; a translation-limiting stop fixed to a dielectric panel outside of the cable passage.

14 Claims, 8 Drawing Sheets

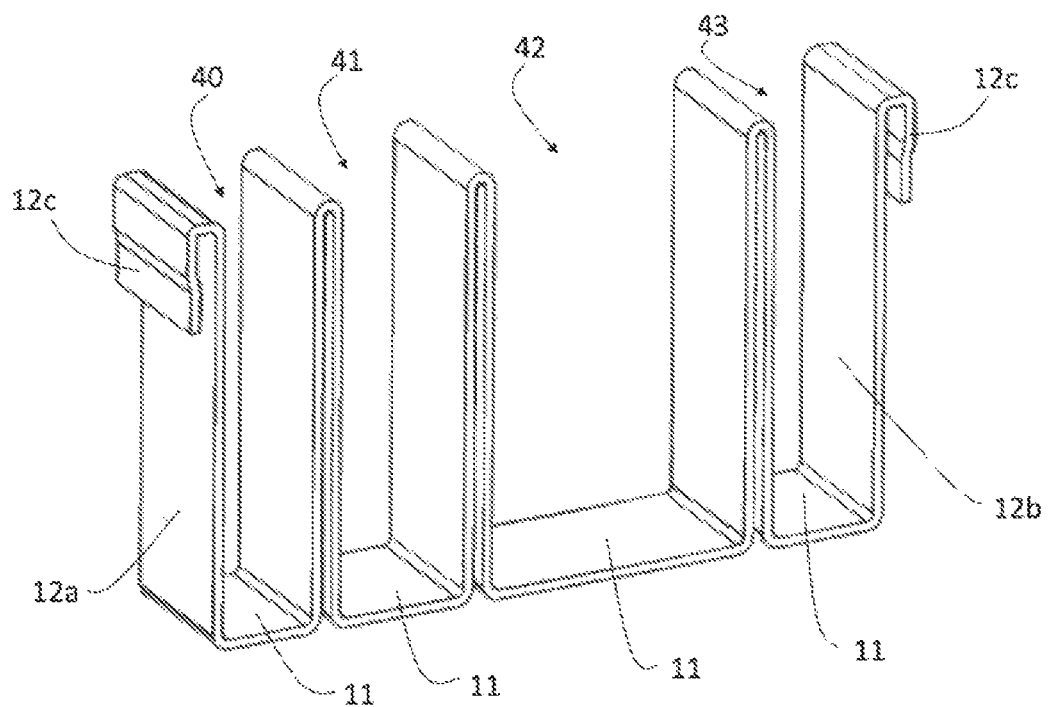

AIRCRAFT CABLE RACEWAY AND ELECTRICAL BARRIER DEVICE

CROSS REFERENCE TO RELATED APPLICATION

This application is a national stage entry of PCT/EP2022/050618 filed Jan. 13, 2022, under the International Convention and claiming priority over French Patent Application No. FR2100565 filed Jan. 21, 2021.

TECHNICAL FIELD

The invention relates to the field of aeronautical engineering and relates to the arrangement of cable raceways within the electrical architectures of the aircraft.

Aircraft cable raceways define the paths of the electrical wiring harnesses relative to the structure of an aircraft, by holding the cable raceways in position and protecting them. The electrical wiring harnesses consist of bundles of cables routed between various electrical installations of the aircraft.

PRIOR ART

Aircraft cable raceways generally consist of profile sections which run in the extension of one another. A predetermined spacing is provided between some profile sections in order to permit a relative movement of the profile sections without damage. More specifically, the aircraft cable raceways can be fixed to the structural parts of the aircraft, which can be flexible. For example, the cable raceways extending along the wings of an aircraft are subjected to a bending movement of relatively large amplitude when the aircraft is in flight.

In the known arrangements of cable raceways, two types of cable raceways are generally provided: power cable raceways routing the power supply cables for equipment or actuators, comprising cables of large section and involving high voltages and/or currents; signal cable raceways provided spaced apart from the above and routing the electrical signal cables, comprising cables of small section and involving low currents and voltages. These different types of cable raceways are dimensioned and insulated accordingly, in view of the currents and voltages implemented for each.

These different types of cable raceways which have different dimensions, in particular relating to the electrical insulation, result in harness routings which are not optimal, in addition to high costs.

SUMMARY OF THE INVENTION

A trend in the latest developments of aircraft design is to re-think the electrical configurations, in particular relative to the routing of the harnesses.

The object of the invention is to improve the arrangements of cable raceways inside aircraft of the prior art.

To this end, the invention relates to an electrical barrier device for an aircraft cable raceway, this device being designed to be positioned where two profile sections of an aircraft cable raceway meet, this device comprising:
- at least one bottom-wall bridging base;
- at least one dielectric panel running transversely to the bottom-wall bridging base and with the bottom-wall bridging base delimiting a passage for cables;
- a translation-limiting stop fixed to a dielectric panel outside of the cable passage.

According to a further subject, the invention relates to an aircraft cable raceway comprising at least two profile sections which are arranged in the extension of one another along a longitudinal axis, the two opposing ends thereof being spaced apart by a predetermined spacing defining a notch and the profile sections each comprising a bottom wall and at least one lateral wall, and this cable raceway comprises an electrical barrier device which corresponds to that described above and which is slidable relative to the profile sections. Moreover:
- the bottom-wall bridging base bears against the bottom wall of each profile section and extends from one edge of the notch to the other;
- the dielectric panel closes the notch between two lateral walls of the profile sections;
- the translation-limiting stop is arranged transversely in the notch between two lateral walls of the profile sections.

Such a cable raceway and its electrical barrier device enable electrical aircraft architectures in which multiple profile sections are grouped together inside the same cable raceways channeling the harnesses which comprise both power cables and signal cables.

For example, the flight controls have to be duplicated in an aircraft for reasons of safety. This redundancy requires a duplication of the wiring circuits which makes the installation complex and expensive in terms of equipment and assembly time. The invention advantageously makes it possible to duplicate these circuits in a coherent manner by transporting both the power and the signals inside the same cable raceways. In this context, the invention can implement duplicated cable raceways, with a channel for the power cabling and a further channel for the signal cabling. This saves space and materials without any electrical risks.

The invention follows recent developments which aim to reduce hydraulic devices within aircraft and to replace them with electrical devices which are increasingly complex and which implement increasingly high voltages. These high voltages are susceptible to the formation of electric arcs.

A significant problem relative to heterogenous cabling lies in the fact that in the case of an electrical anomaly, due for example to a fault in the insulation of a conductor, an electric arc can be produced between the defective conductor and an element which is outside the cable raceway or which is arranged in an adjacent profile section within the same cable raceway.

The dielectric panel partitions the space of the notch, and its dimensions and its material are preferably selected to prevent any electric arc in view of the voltages implemented in an application.

The electrical barrier device makes it possible to connect functionally the ends of two profile sections which together form a cable raceway, by increasing the predetermined spacing which promotes an improved adaptation to the flexibility of the aeronautical structures on which the cable raceways are mounted.

The increase in this predetermined spacing is carried out without affecting the quality of the electrical insulation of the cable raceway, and conversely the risk of the formation of an electric arc is reduced. Due to the invention, therefore, the predetermined spacings between the profile sections can be increased without the risk of the occurrence of an electric arc. In the prior art, these predetermined spacings are reduced to a minimum and are, for example, in the order of 3 mm to limit the risks of an electric arc. In this same type of application, the invention makes it possible to increase this predetermined spacing to values in the order of 8 mm which increases the capacity of the cable raceway to resist bending, while guaranteeing the absence of an electric arc where the profile sections meet.

The electrical barrier device is also able to slide relative to the profile sections of the cable raceway and thus permits a relative movement of the opposing ends of the two profile sections, without interference from the electric barrier device. The translation-limiting stop also makes it possible to keep the electrical barrier device functional in the region of the notch, by maintaining the amplitude of this sliding connection at a value corresponding to the predetermined spacing.

The electrical barrier device is preferably retained directly in the aircraft cable raceway by the harness which is located in the cable raceway, such that the electrical barrier device does not require any fixing means on the cable raceway. This saves time and production means during the assembly of the aircraft. The positioning of the electrical barrier device on the cable raceway is also carried out without any potential positioning errors, the translation-limiting stop simply being inserted into the notch.

The electrical barrier device is particularly advantageous for cable raceways comprising multiple profile sections arranged in parallel, the translation-limiting stop thus also being able to form a connecting bridge between different portions of the device corresponding to different cable guide channels.

The electrical barrier device according to the invention can comprise the following additional features, individually or in combination:
- the translation-limiting stop is implemented by a rib extending substantially perpendicularly to the dielectric panels;
- the rib constituting the translation-limiting stop extends over more than half of the height of the dielectric panels to which it is attached;
- the translation-limiting stop also connects the two bottom-wall bridging bases;
- the electrical barrier device is injection-molded;
- the bottom-wall bridging base comprises at least one slot;
- at least one dielectric panel comprises at least one retaining clip to fix the device to a profile section of a cable raceway.

The cable raceways according to the invention can comprise the following additional features, individually or in combination:
- the electrical barrier device is mobile in translation along the longitudinal axis, this translation being limited, on the one hand, by the contact of the translation-limiting stop with one of the profile sections and, on the other hand, by the contact of the translation-limiting stop with the other profile section;
- the profile sections each comprise at least two cable guide channels, the two bottom-wall bridging bases of the electrical barrier device each being arranged in one of these cable guide channels;
- the translation-limiting stop is arranged transversely in the portion of the notch located between the two cable guide channels;
- the cable raceway comprises electrical wiring harnesses which are arranged in the two cable guide channels and which extend in the cable passages of the electrical barrier device;
- the cable raceway comprises a resilient joint connecting the two profile sections in the region of the notch;
The profile sections comprise at least one complementary projection which is opposite the slot of the bottom-wall bridging base.

DESCRIPTION OF THE FIGURES

Further features and advantages of the invention will be found in the non-limiting description which follows, with reference to the accompanying drawings, in which:

FIG. 8 is a view in perspective of the barrier device having retaining clips.

DETAILED DESCRIPTION

Figure 1:
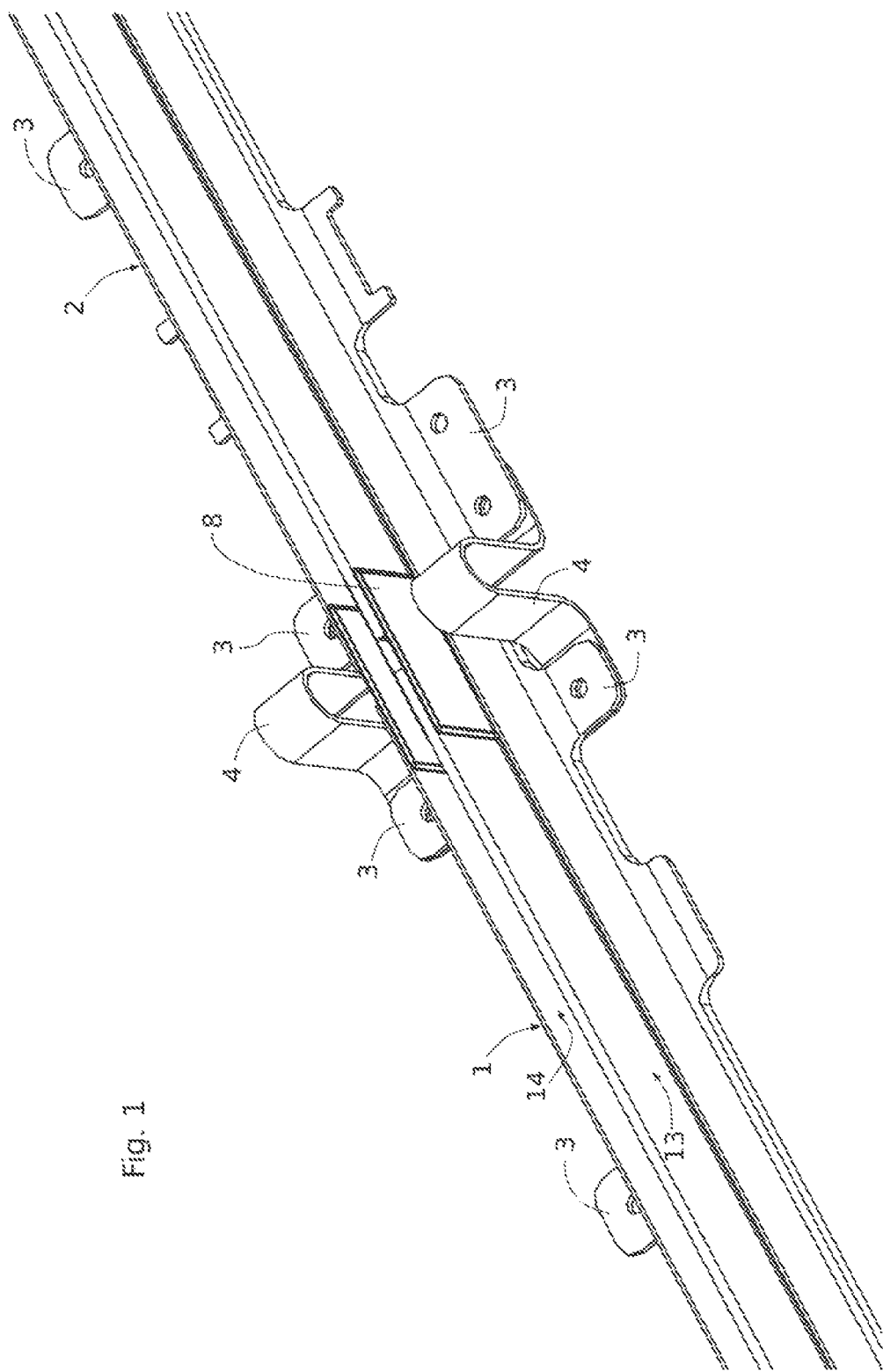
FIG. 1 shows in perspective a cable raceway according to the invention.

FIG. 1 shows in perspective a portion of a cable raceway implemented inside an aircraft.

This cable raceway comprises a first profile section 1 and a second profile section 2 which are arranged in the extension of one another along the longitudinal axis and which are fixed to the structure of the aircraft by fixing lugs 3. One end of each of the profile sections 1, 2 is visible in FIG. 2. These ends are opposite one another and are connected by a resilient joint 4 connecting the fixing lugs 3 of each of the profile sections 1, 2. The resilient joint 4 can be implemented by any means permitting a flexible connection between the profile sections and is constituted here by two resilient lugs having a U-shaped body.

Figure 2:
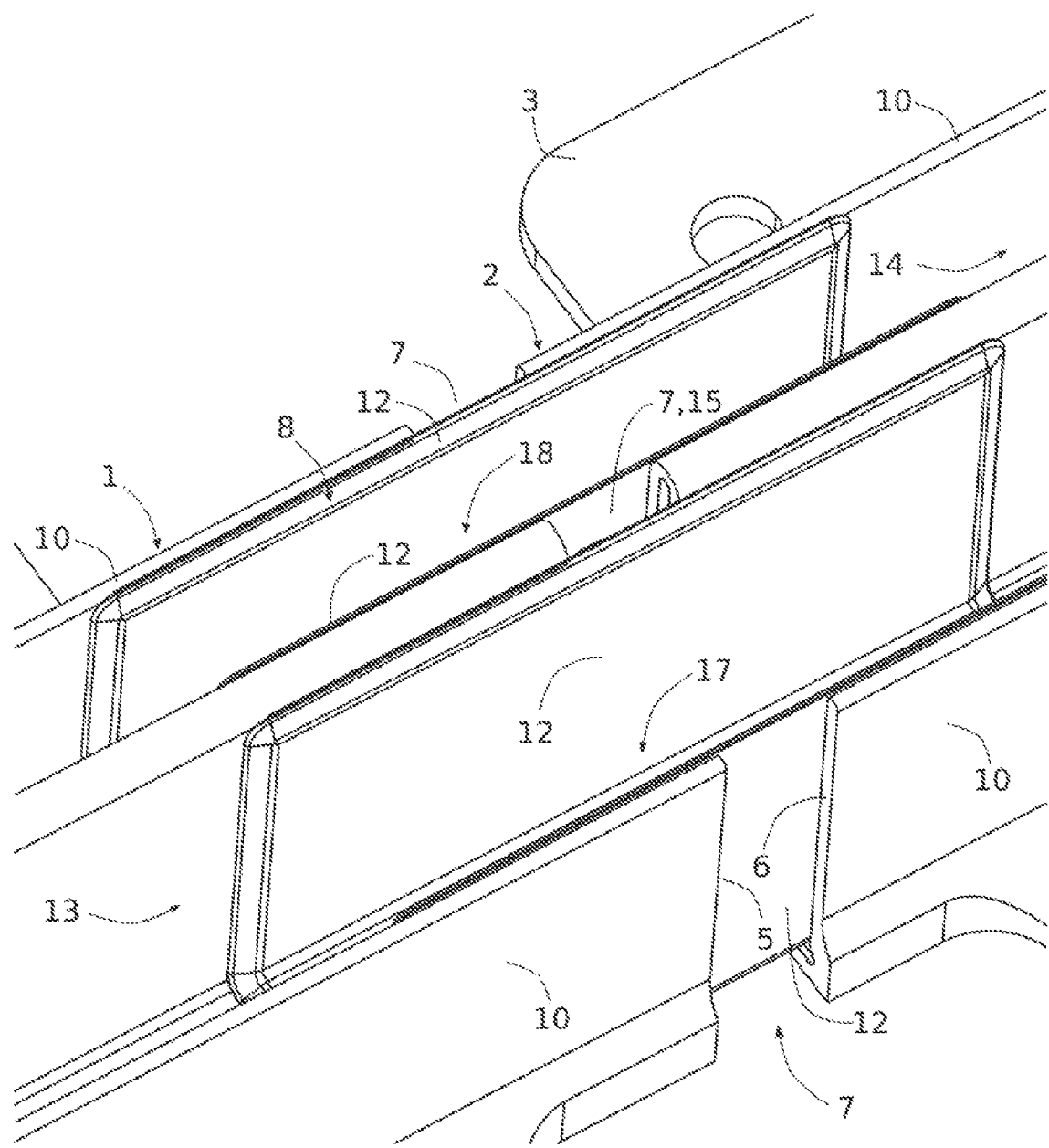
FIG. 2 is a detailed view of FIG. 1.

FIG. 2 is an enlarged view of the zone where the profile sections 1, 2 meet. The two profile sections 1, 2 are fixed such that one end 5 of the first profile section 1 is arranged opposite one end 6 of the second profile section 2. A predetermined spacing constituting a notch 7 is provided between the ends 5, 6 of the profile sections 1, 2. The notch 7 permits a relative movement of the profile sections 1, 2 following the movement permitted by the resilient joint 4 to allow the cable raceway to follow the deformations of the structure of the aircraft, in particular when the aircraft is in flight.

The notch 7, which has a uniform width here, is defined by the predetermined spacing between the profile sections 1, 2 which is dimensioned for each aircraft as a function of its bending behavior in the zone relating to the passage of the cable raceway.

The cable raceway consists, in this example, of profile sections 1, 2 which are each double profile sections, i.e. these profile sections 1, 2 comprise two longitudinal compartments each formed by a bottom wall 9 and two lateral walls 10. The profile sections 1, 2 are placed end to end such that these longitudinal compartments together form two channels 13, 14 extending in parallel along the cable raceway. The illustrated cable raceway thus comprises two separate channels 13, 14 designed to retain and protect the electrical wiring harness.

Figure 3:
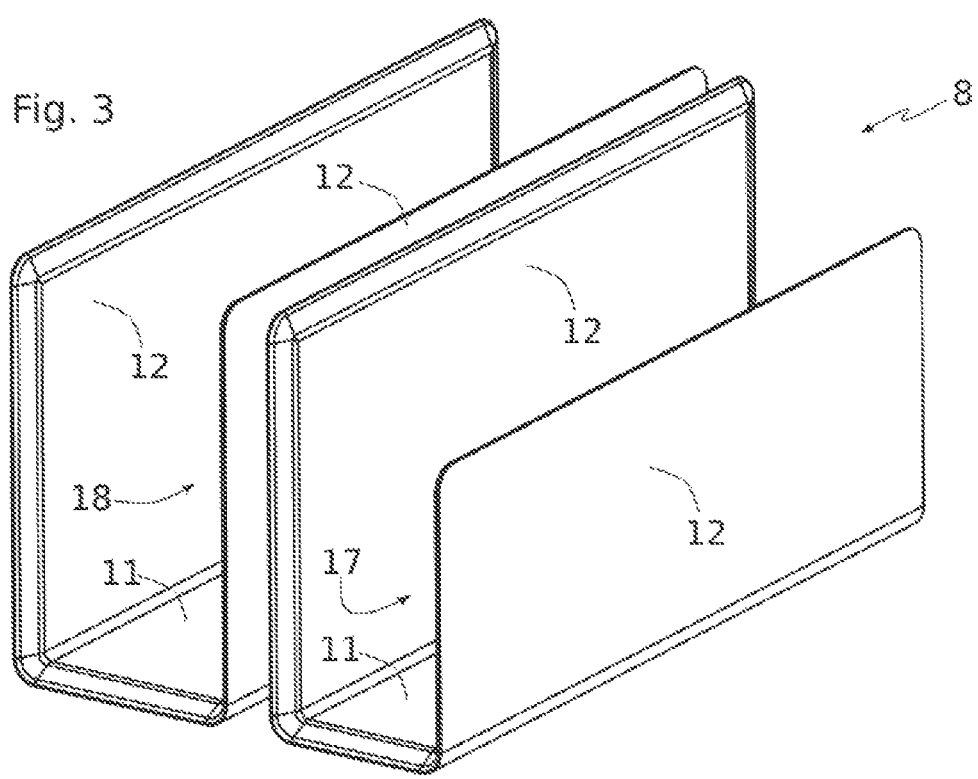
FIG. 3 shows in perspective an electrical barrier device according to the invention.

The cable raceway also comprises an electrical barrier device 8 which is shown individually in perspective in FIG. 3.

The electrical barrier device 8, which is injection-molded, comprises two cable passages 17, 18 corresponding to two channels 13, 14 of the cable raceway. Each of these cable passages is delimited by a bottom-wall bridging base 11 and by two dielectric panels 12 running transversely from the base 11. In the present example, the dielectric panels 12 protrude perpendicularly from the corresponding base 11.

The bottom-wall bridging base 11 is designed to produce a bridge between the bottom wall 9 of a profile section 1 and the bottom wall 9 of the other profile section 2 in the region of the notch 7.

The dielectric panels 12 are produced from a dielectric material suitable for insulating the harnesses to be mounted in the cable raceway, in particular relative to the voltages involved. The dielectric panels 12 are dimensioned (in terms of thickness and choice of material) to avoid the passage of an electric arc between the two channels 13, 14 via the notch 7. More specifically, the notch 7 comprises a central portion 15 delimited by a space between the ends of the central lateral walls 10 (i.e. the lateral walls 10 between the two channels 13, 14).

Figure 4:
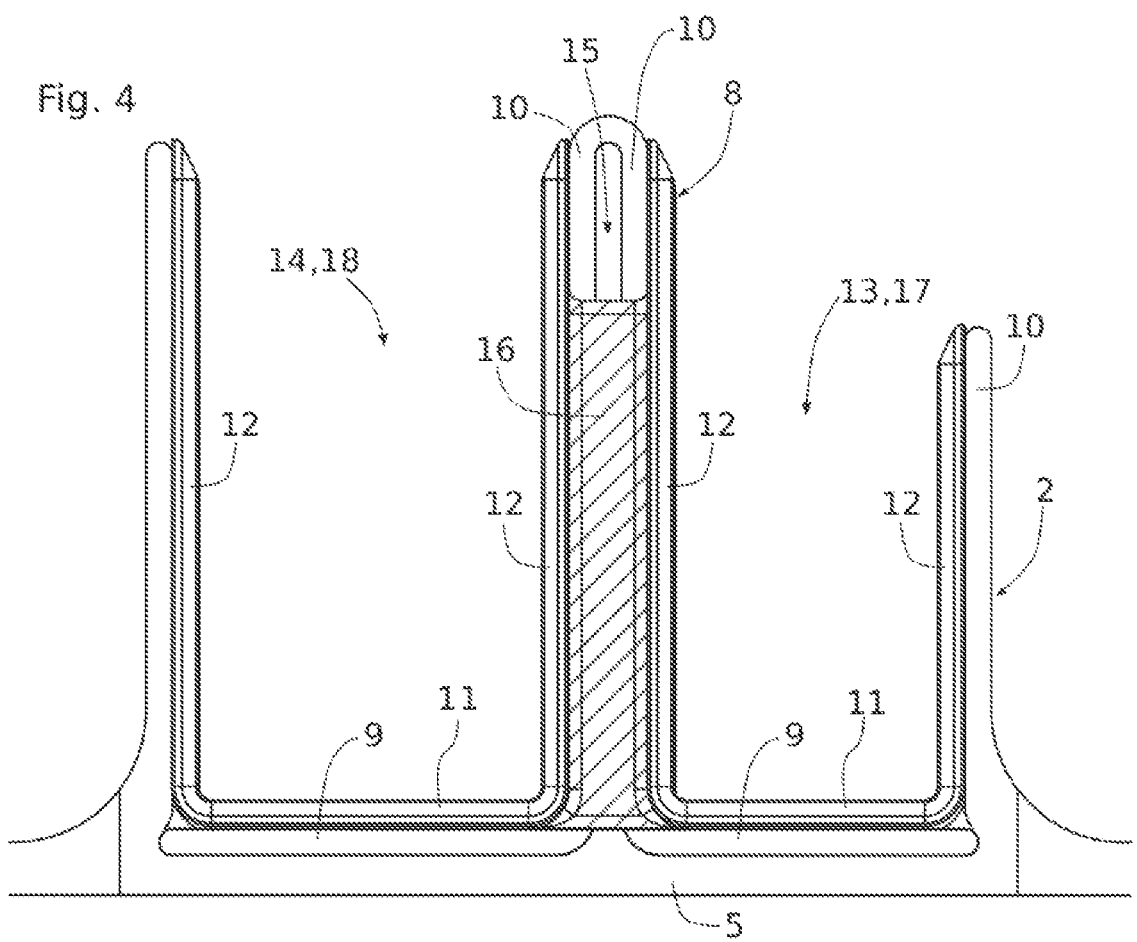
FIG. 4 is a sectional view of the cable raceway of FIG. 1.
Figure 5:
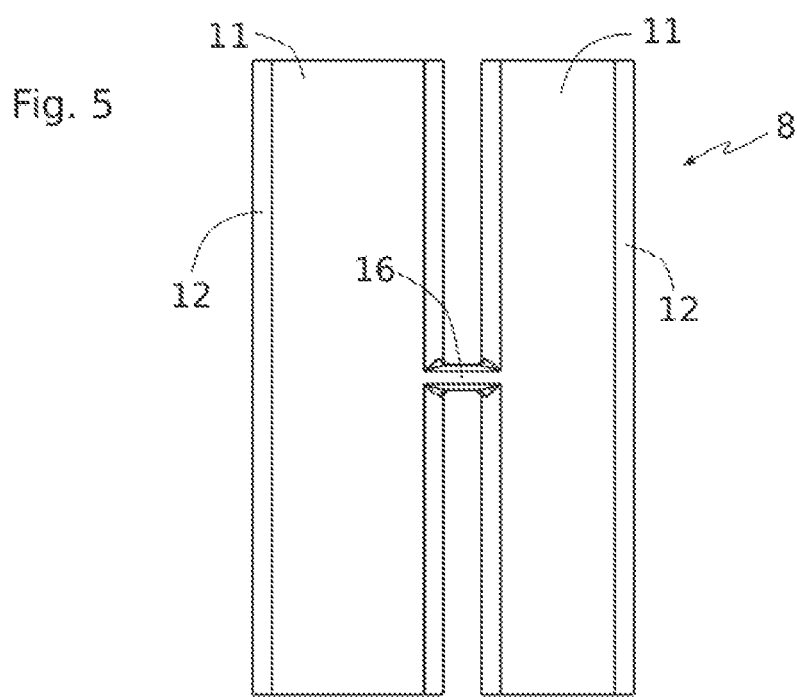
FIG. 5 is a view from below of the electrical barrier device of FIG. 3.

The electrical barrier device 8 also comprises a translation-limiting stop 16 which connects the two central dielectric panels 12. The translation-limiting stop 16 is fixed to the dielectric panels 12 outside the cable passages 17, 18. FIGS. 4 and 5 show the geometry of the translation-limiting stop 16.

FIG. 4 is a view of the cable raceway in cross section according to a plane which is perpendicular to the cable raceway and which passes through the notch 7 intersecting the translation-limiting stop 16. The oblique hatched lines illustrate the section through the thickness of the stop 16. This stop 16 consists of a rib which extends perpendicularly to the dielectric panels 12 and which extends over a significant height from the base 11. In the present example, the rib forming the stop 16 extends over more than half of the height of the dielectric panels 12 to which it is attached, and this height is in the order of three quarters of the height of the central dielectric panels 12. The height is defined here as the dimension taken along the vertical with reference to FIG. 4.

The portions of the dielectric panels 12 are preferably chamfered so as not to damage the wiring harnesses during the positioning thereof in the channels 13, 14.

The electrical barrier device 8 is arranged relative to the profile sections 1, 2 such that the bottom-wall bridging bases 11 extend through the notch 7, between the two bottom walls 9 of the profile sections 1, 2 for each channel 13, 14. Similarly, the dielectric panels 12 extend through the notch 7 and close this notch 7 between the lateral walls 10 of the profile sections 1, 2.

The two central lateral walls 10 are sandwiched by the two central dielectric panels 12 which are connected by the translation-limiting stop 16. The translation-limiting stop 16 is arranged transversely in the central portion 15 of the notch 7, i.e. the portion which is located between the two cable guide channels 13, 14.

With reference to FIGS. 2 and 4, the electrical barrier device 8 is mounted at the joint between the two profile sections 1, 2 with a mechanical clearance which permits sliding in the profile sections 1, 2. The electrical barrier device 8 can be mounted by any means permitting a sliding connection on the profile sections 1, 2. In the present example, the sliding connection is obtained by a plane-to-plane connection between, on the one hand, the bases 11 and the corresponding bottom walls 9 and, on the other hand, between the dielectric panels 12 and the corresponding lateral walls 10.

FIG. 5 illustrates the electrical barrier device 8 viewed from below and also shows the attachment of the two bridging bases 11 via the translation-limiting stop 16.

Figure 6:
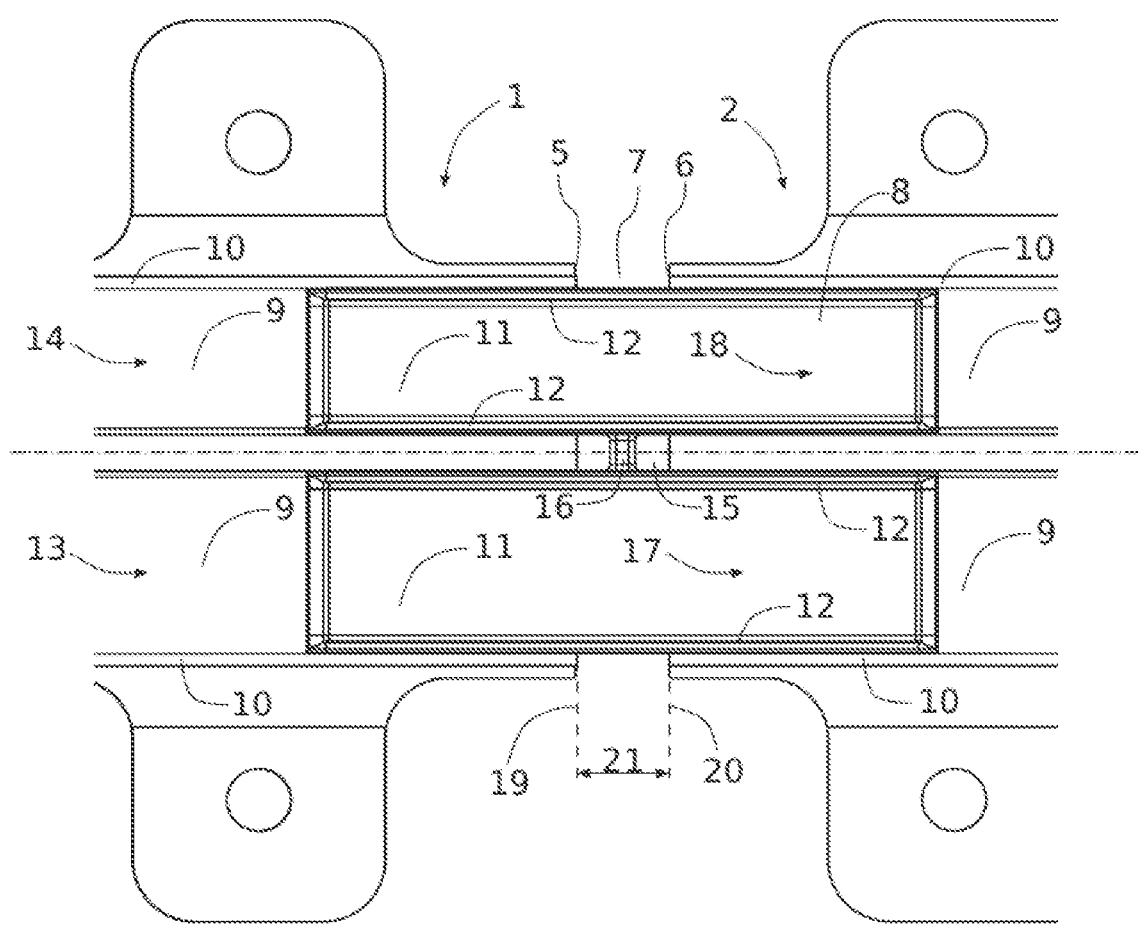
FIG. 6 is a view from above of the cable raceway of FIG. 1.

FIG. 6 is a view from above of the elements of FIG. 2. In this view, the electrical barrier device 8 is in the central position relative to its possible amplitude in translation, the translation-limiting stop 16 being located midway between the two ends 5, 6 of the profile sections 1, 2.

From this position of FIG. 6, the electrical barrier device 8 is designed for free translation relative to the profile sections 1, 2 between:
- a first extreme stop position 19 corresponding to the positioning of the translation-limiting stop 16 against the end 5 of the first profile section 1; and
- a second extreme stop position 20, corresponding to the positioning of the translation-limiting stop 16 against the end 6 of the second profile section 2.

These two extreme stop positions 19, 20 define an amplitude of translation 21 in the sliding of the electrical barrier device 8 along the longitudinal axis 22 of the cable raceway.

The electrical barrier device 8 is adjusted to the dimensions of the profile sections 1, 2 and is mounted in the cable raceway without any fixing. The translation-limiting stop 16 retains the device 8 in the region of the notch 7 by closing it and permitting the translation movement. The device 8 is also retained on the profile sections by the wiring harnesses themselves (not shown) which extend along the length of the channels 13, 14 and which thus push the bottom-wall bridging base 11 against the corresponding bottom walls 9.

Figure 7:
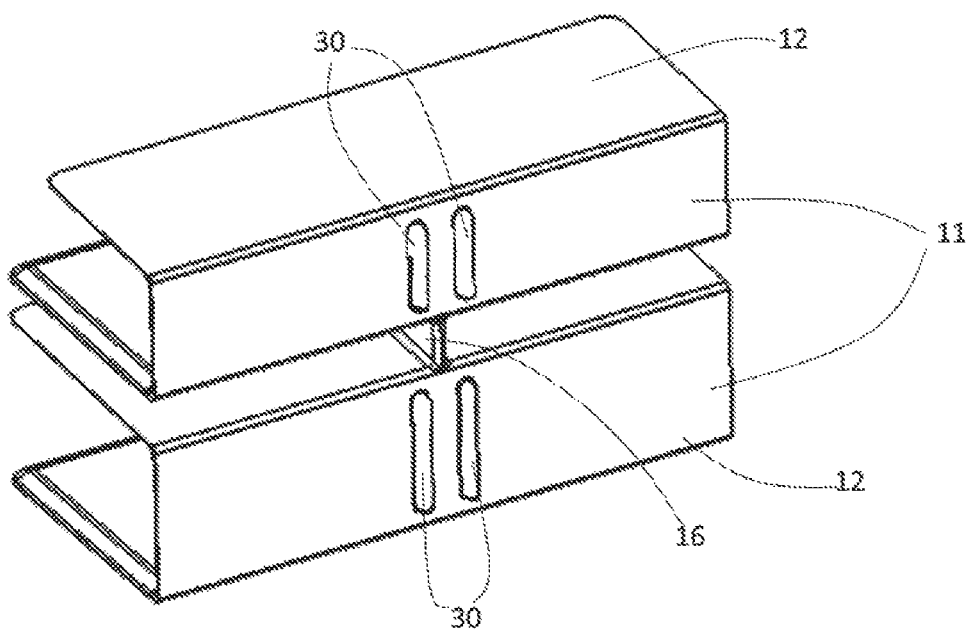
FIG. 7 is a view from below of the barrier device having slots on the bottom-wall bridging base.

FIG. 7 is a view from below of the barrier device 8, the bottom-wall bridging base 11 thereof comprising four slots 30 arranged in the vicinity of the ends 5, 6 of the profile sections 1, 2. These ends have projections oriented toward the base 11, these projections being complementary and opposite the slots 30. The association of the projections and the slots 30 makes it possible to provide an additional retention of the barrier device 8 in the profile sections 5, 6 and to reinforce the effect of the translation-limiting stop 16.

FIG. 8 shows a view in perspective of a barrier device 8 having four cable passages 40, 41, 42, 43 and two extreme dielectric panels 12a, 12b each comprising a retaining clip 12c. These retaining clips 12c make it possible to fix the barrier device 8 to the profile sections 1, 2 of the cable raceway and also reinforce the effect of the translation-limiting stop 16 by gripping the lateral walls 10 of the profile sections 1, 2. These clips 12c are formed here during the molding of the barrier device 8 but they can also be fixed to the extreme dielectric panels 12a, 12b by adhesive bonding or by any other fixing means.

Variants of the electrical barrier device 8 can be implemented. In the present example, the electrical barrier device 8 relates to a cable raceway comprising two channels, the dimensions thereof being able to be different. However, the electrical barrier device 8 can be adapted to any cable raceway, whatever the number of channels thereof.

Moreover, the electrical barrier device 8 can comprise a plurality of translation-limiting stops which are aligned and redundant, for safety reasons. These stops can also extend over the base 11 of the device and over any dielectric panel 12 in order to bear against the notch 7 between the profile sections 1, 2.

The invention claimed is:

1. An electrical barrier device (8) for an aircraft cable raceway, the device being designed to be positioned where two profile sections (1, 2) of an aircraft cable raceway meet, the device comprising:

at least one bottom-wall bridging base (11);

at least one dielectric panel (12) running transversely to the bottom-wall bridging base (11) and with the bottom-wall bridging base (11) delimiting a passage for cables (17, 18);

a translation-limiting stop (16) fixed to a dielectric panel (12) outside of the cable passage (17, 18);

wherein said electrical barrier device (8) comprises at least two cable passages (17, 18), each delimited by a bottom-wall bridging base (11) and by two dielectric panels (12) protruding perpendicularly from the bottom-wall bridging base (11), and wherein the translation-limiting stop (16) connects a dielectric panel (12) of one of the cable passages to a dielectric panel (12) of the other cable passage.

2. The device as claimed in claim 1, wherein the translation-limiting stop (16) is implemented by a rib extending substantially perpendicularly to the dielectric panels (12).

3. The device as claimed in claim 2, wherein the rib constituting the translation-limiting stop (16) extends over more than half of the height of the dielectric panels (12) to which it is attached.

4. The device as claimed in claim 1, wherein the device is injection molded.

5. The device as claimed in claim 1, wherein the bottom-wall bridging base (11) comprises at least one slot (30).

6. The device as claimed in claim 1, wherein the at least one dielectric panel (12) comprises at least one retaining clip (12c).

7. An aircraft cable raceway comprising:

at least two profile sections (1, 2) which are arranged in the extension of one another along a longitudinal axis (22), the two opposing ends (5, 6) thereof being spaced apart by a predetermined spacing defining a notch (7) and the profile sections (1, 2) each comprising a bottom wall (9) and at least one lateral wall (10), an electrical barrier device (8) as claimed in claim 1, which is slidable relative to the profile sections (1, 2) and in that:

the bottom-wall bridging base (11) bears against the bottom wall (9) of each profile section (1, 2) and extends from one edge to the other of the notch (7);

the dielectric panel (12) closes the notch (7) between two lateral walls (10) of the profile sections (1, 2);

the translation-limiting stop (16) is arranged transversely in the notch (7) between two lateral walls (10) of the profile sections (1, 2).

8. The aircraft cable raceway as claimed in claim 7, wherein the electrical barrier device (8) is mobile in translation along the longitudinal axis (22), the translation being limited, on the one hand, by the contact of the translation-limiting stop (16) with one of the profile sections (1) and, on the other hand, by the contact of the translation limiting stop (16) with the other profile section (2).

9. The aircraft cable raceway as claimed in claim 8, wherein the profile sections (1, 2) each comprise at least two cable guide channels (13, 14), the two bottom-wall bridging bases (11) of the electrical barrier device (8) each being arranged in one of the cable guide channels (13, 14).

10. The cable raceway as claimed in claim 9, further comprising electrical wiring harnesses which are arranged in the two cable guide channels (13, 14) and which extend in the cable passages (17, 18) of the electrical barrier device (8).

11. The cable raceway as claimed in claim 9, wherein the translation-limiting stop (16) is arranged transversely in the portion of the notch (7) located between the two cable guide channels (13, 14).

12. The cable raceway as claimed in claim 7, further comprising a resilient joint (4) connecting the two profile sections (1, 2) in the region of the notch (7).

13. The cable raceway as claimed in claim 7, wherein the profile sections (1, 2) comprise at least one complementary projection which is opposite a slot (30) of the bottom-wall bridging base (11).

14. An electrical barrier device (8) for an aircraft cable raceway, the device being designed to be positioned where two profile sections (1, 2) of an aircraft cable raceway meet, the device comprising:

at least one bottom-wall bridging base (11);

at least one dielectric panel (12) running transversely to the bottom-wall bridging base (11) and with the bottom-wall bridging base (11) delimiting a passage for cables (17, 18);

a translation-limiting stop (16) fixed to a dielectric panel (12) outside of the cable passage (17, 18);

wherein said electrical barrier device (8) comprises at least two cable passages (17, 18), each delimited by a bottom-wall bridging base (11) and by two dielectric panels (12) protruding perpendicularly from the bottom-wall bridging base (11), and wherein the translation-limiting stop (16) connects a dielectric panel (12) of one of the cable passages to a dielectric panel (12) of the other cable passage; and wherein the translation-limiting stop (16) also connects the two bottom-wall bridging bases (11).

* * * * *